(12) United States Patent
Rich et al.

(10) Patent No.: US 11,907,401 B2
(45) Date of Patent: Feb. 20, 2024

(54) SYSTEMS AND METHODS TO MAINTAIN USER PRIVACY WHTLE PROVIDING RECOMMENDATIONS

(71) Applicant: Warner Bros. Entertainment Inc., Burbank, CA (US)

(72) Inventors: Sarah J. Rich, York, ME (US); Benjamin Recht, Berkeley, CA (US)

(73) Assignee: Warner Bros. Entertainment Inc., Burbank, CA (US)

( * ) Notice: Subject to any disclaimer, the term of this patent is extended or adjusted under 35 U.S.C. 154(b) by 299 days.

(21) Appl. No.: 16/919,056

(22) Filed: Jul. 1, 2020

(65) Prior Publication Data

US 2021/0012031 A1 Jan. 14, 2021

Related U.S. Application Data

(60) Provisional application No. 62/869,202, filed on Jul. 1, 2019.

(51) Int. Cl.
*G06F 21/62* (2013.01)
*G06F 16/9535* (2019.01)

(52) U.S. Cl.
CPC ...... *G06F 21/6254* (2013.01); *G06F 16/9535* (2019.01); *G06F 21/6263* (2013.01)

(58) Field of Classification Search
CPC ............ G06F 21/6254; G06F 16/9535; G06F 21/6263; G06F 21/6245
See application file for complete search history.

(56) References Cited

U.S. PATENT DOCUMENTS

2018/0189306 A1* 7/2018 Lamere ............ G06F 16/90324

FOREIGN PATENT DOCUMENTS

WO WO-2019120579 A1 * 6/2019 ............ G06N 20/20

OTHER PUBLICATIONS

Chen, M.- H., et al., (2016). A population-based incremental learning approach with artificial immune system for network intrusion detection. Eng. Appl. Artif. Intel. (Year: 2016) (Year: 2016).*

* cited by examiner

*Primary Examiner* — Brian F Shaw
(74) *Attorney, Agent, or Firm* — Bookoff McAndrews, PLLC

(57) ABSTRACT

A systematic method of introducing obfuscating "organic" noise to a user's content engagement history leverages a recommender system by creating a public history on a client device which is a superset of the user's true engagement history. The method builds up the superset history over time through a client's interaction with the recommender system by simulating organic growth in a user's actual engagement history. The organic superset prevents an adversary with access to the underlying recommendation model from readily distinguishing between signal and noise in a user's query and obfuscates the user's engagement history with the recommender system.

17 Claims, 8 Drawing Sheets

FIG. 4

Algorithm 1 Organic Noising

```
 1: procedure GET AND SORT RECS( {cluster}_{i=0}^{k} )
 2:     recs ← recommendations(∪_{i=0}^{k} cluster_i)   ▷ Calls
        the recommender, gets random popular recs if clusters are
        empty
 3:     for rec ∈ recs, i ∈ 0...k do
 4:         if rec.associated_item ∈ cluster_i then
 5:             recs_i.add(rec.item)
 6:         end if
 7:     end for
 8:     for item ∈ recs_i, i ∈ 0...k do
 9:         w(item) ← Σ_{rec|rec.item=item} rec.weight
10:         rank(item) ← r   ▷ The position of item when
        cluster i's recs are sorted by decreasing values of w
11:     end for
12:     return ({recs_i}_{i=0}^{k}, rank)
13: end procedure
14: procedure UPDATE HISTORY( {cluster}_{i=0}^{k}, {recs}_{i=0}^{k},
    rank, liked_item)   ▷ What to do when a user likes an
    item
15:     if cluster_0 = {} then:       ▷ If user's first like
16:         cluster_0.add(liked_item)
17:         for i ∈ 1...k do          ▷ Seed noise clusters
18:             cluster_i.add(random_item)
19:         end for
20:     else
21:         cluster_0.add(liked_item)
22:         r ← rank(liked_item)
23:         for i ∈ 1...k do
24:             cluster_i.add(recs_i[r])
25:         end for
26:     end if
27: end procedure
28: procedure ONE RECOMMENDATION ROUND
29:     GET AND SORT RECS
30:     if user likes an item then
31:         UPDATE HISTORY
32:     end if
33: end procedure
```

SYSTEMS AND METHODS TO MAINTAIN USER PRIVACY WHILE PROVIDING RECOMMENDATIONS

PRIORITY CLAIM

The present application claims priority to U.S. provisional patent application Ser. No. 62/869,202 filed Jul. 1, 2019, which is incorporated herein in its entirety by reference.

FIELD

The present application relates to obfuscation in online transactions or digital communication via electronic or optical media, for example, obfuscation of user selection data for protecting user privacy in online engagement with a recommender system.

BACKGROUND

Recommender systems, also referred to herein as recommenders and in singular as a recommender, are a class of machine learning algorithms and computing systems using such algorithms that analyze user engagement with one or more computerized information resources, learn user interests and preferences by analyzing the engagement history, and provide recommendations to the user regarding information likely to be of interest. Such systems are useful to end users, but if designed naively may expose details of the user's engagement history to the recommender system. Consequently, various methods have been developed by which users can benefit from using recommender systems while obfuscating their engagement history at least partly and retaining a degree of privacy regarding their engagement history. Prior methods may be subject to certain disadvantages.

Privacy-preserving recommender systems often differentiate between the learning phase of training a recommender and the recommendation phase. To implement differential privacy during the learning phase, some have shown that the addition of random noise to training data is sufficient for the popular schemes of nearest-neighbors and matrix factorization. Others have demonstrated that Matrix Factorization (MF) models can be learned online obviating the need for the retention of any user data by a central server. In this context, differential privacy considers whether the presence or absence of a user's information can be detected by an adversary with access to the trained machine learning model.

However, when the content being consumed is perceived as being of a sensitive nature, that users may be hesitant to reveal preferences to a recommender as needed to receive quality recommendations. Even if those preferences cannot later be extracted from the model itself and raw user request data is not retained by a system server, an interloper or a rogue insider with access to the underlying recommendation model can use the model to determine with reasonable accuracy in any individual request which part of the user's engagement history is genuine and which part is noise, leaving a user's true engagement history effectively in the open.

Some architectural and algorithmic solutions for privacy defense send perturbed data to a centralized server and leverage the client device to store a copy of the user's history as well as process and filter recommendations that are returned. Another approach implements a decentralized architecture and data obfuscation through ratings augmentation. Others have introduced the notion of using data perturbation to attain plausible deniability in recommender systems, and then extended their work to the scenario where user ratings are binary, as well as to combining Principal Component Analysis (PCA) and Singular Value Decomposition (SVD) based recommenders with random perturbations of integer ratings. Another approach challenges the item-invariance of the perturbation magnitude in these randomization approaches, but does not address the cluster structure of this type of data. Others have attempted to preserve cluster structure when obfuscating training data using a two-step transformation. Cluster structure is acknowledged and leveraged but only for preventing de-anonymization by a third party, and obfuscation of a user's general interests is lacking.

Recent advances in privacy for recommender systems such as summarized above have focused on limiting the ability of an adversary to access user data from a trained machine learning model. However, these private methods for training recommenders may not effectively obfuscate a user's engagement history at recommendation time. Thus, prior approaches may leave users' engagement histories open to discovery by unauthorized or adversarial entities.

It would be desirable, therefore, to develop new methods and other new technologies for interacting with a recommendation system, that overcomes these and other limitations of the prior art.

SUMMARY

This summary and the following detailed description should be interpreted as complementary parts of an integrated disclosure, which parts may include redundant subject matter and/or supplemental subject matter. An omission in either section does not indicate priority or relative importance of any element described in the integrated application. Differences between the sections may include supplemental disclosures of alternative embodiments, additional details, or alternative descriptions of identical embodiments using different terminology, as should be apparent from the respective disclosures.

To improve user privacy, a systematic method herein referred to as 'SHY' introduces "organic" noise to a user's content engagement history using a client-side application. Instead of adding noise at random in each request, the method leverages the recommender system by creating a public history on the client which is a superset of the user's true engagement history. The method builds up the superset history over time through a client's interaction with the recommender the same way a user's actual engagement history would grow. This prevents an adversary with access to the underlying recommendation model from readily distinguishing between signal and noise in a user's query. For example, in a prototype system by inventors hereof, an item-based recommender for recommending musical artists used a publicly available data set (Last.fm) to simulate clients. Without degrading recommendation quality, organic noising significantly outperformed uniform noising in obscuring a user's true engagement history on a per-request basis.

SHY straddles the categories of architectural and algorithmic solutions to privacy defense. Including sending perturbed data to a centralized server but also leveraging the client to store a copy of the user's history as well as process and filter recommendations that are returned. Innovations of the SHY methods include avoiding direct peer exchange or any peer-to-peer sharing to build up fake parts of a user profile—this also user interests or preferences. The method introduces plausible deniability over engagement with entire regions of item-space rather than individual items themselves.

In an aspect of the disclosure, a method for obfuscating a recommendation request, may include at least one processor receiving, from a server, a plurality of information items each defined by digital data, and presenting, via an interface, a first subset of the plurality of items. The method may further include receiving, by the at least one processor via the interface, a first selection of at least one item from the first subset of the plurality of items, and assembling a first request containing the first selection and a selection of another subset of the plurality of items, wherein each item of the first request defines one of a plurality of clusters. The method may further include transmitting the first request to the server; and performing operations recursively as described below.

The recursive operations by the at least one processor may include: (a) receiving, from the server, a plurality of recommendation items, wherein each item of the plurality of recommendation items is (1) attributed to an attributed item contained in the most recent prior request of the recursive operations, and (2) assigned a measure representing a closeness of the item to the attributed item (e.g., similarity); (b) receiving, via the interface, a subsequent selection of at least one item from a subset of the plurality of recommendation items, wherein each item of the subset of the plurality of recommendation items is attributed to at least one item in (i) the first selection or (ii) at least one subsequent selection that was previously selected, and (c) assembling a next subsequent request containing the at least one subsequent selection and noise.

In related aspects, the selection of another subset of the plurality of items may be, or may include, a randomized selection of another subset of the plurality of items. Each request item in the selection may have an equal number of attributed items in the plurality of recommendation items. In an alternative, or in addition, each request item in the selection may have an unequal number of attributed items in the plurality of recommendation items.

In another aspect, the at least one processor may generate the noise for each item in the subsequent selection at least in part by choosing from each cluster an item having an equal ranked measure, and appending the item having an equal ranked measure to the next subsequent request, wherein a cluster membership of each cluster is inherited through the attributed item. Thus, the at least one processor gradually builds up an obfuscating superset of the user's actual engagement within which the user's actual engagement history cannot readily be distinguished. In a related aspect, the measure used in ranking clusters may be, or may include, a scaled weight 'w' representing a closeness of the recommended item to the associated item.

In another aspect, the subsequent request may be, or may include, a request that is most recent.

As used herein, a "client" or "client device" includes at least a computer processor coupled to a memory and to one or more ports, including at least one input port and at least one output port (e.g., a desktop computer, laptop computer, tablet computer, smartphone, PDA, etc.). A computer processor may include, for example, a microprocessor, microcontroller, system on a chip, or other processing circuit. As used herein, a "processor" means a computer processor. Program instructions for causing an apparatus to perform operations described herein, and related operations, may be stored on a non-transitory computer-readable medium for distribution to one or more client devices. When loaded into working memory of a client device and executed by at least one processor of the client device, the program instructions cause the client device to perform the described operations.

To the accomplishment of the foregoing and related ends, one or more examples comprise the features hereinafter fully described and particularly pointed out in the claims. The following description and the annexed drawings set forth in detail certain illustrative aspects and are indicative of but a few of the various ways in which the principles of the examples may be employed. Other advantages and novel features will become apparent from the following detailed description when considered in conjunction with the drawings and the disclosed examples, which encompass all such aspects and their equivalents.

BRIEF DESCRIPTION OF THE DRAWINGS

The features, nature, and advantages of the present disclosure will become more apparent from the detailed description set forth below when taken in conjunction with the drawings in which like reference characters identify like elements correspondingly throughout the specification and drawings.

FIG. 4 illustrates an example of program code for organic noising.

DETAILED DESCRIPTION

Various aspects are now described with reference to the drawings. In the following description, for purposes of explanation, numerous specific details are set forth to provide a thorough understanding of one or more aspects. It may be evident, however, that the various aspects may be practiced without these specific details. In other instances, well-known structures and devices are represented in block diagram form to facilitate focus on novel aspects of the present disclosure.

Figure 1:
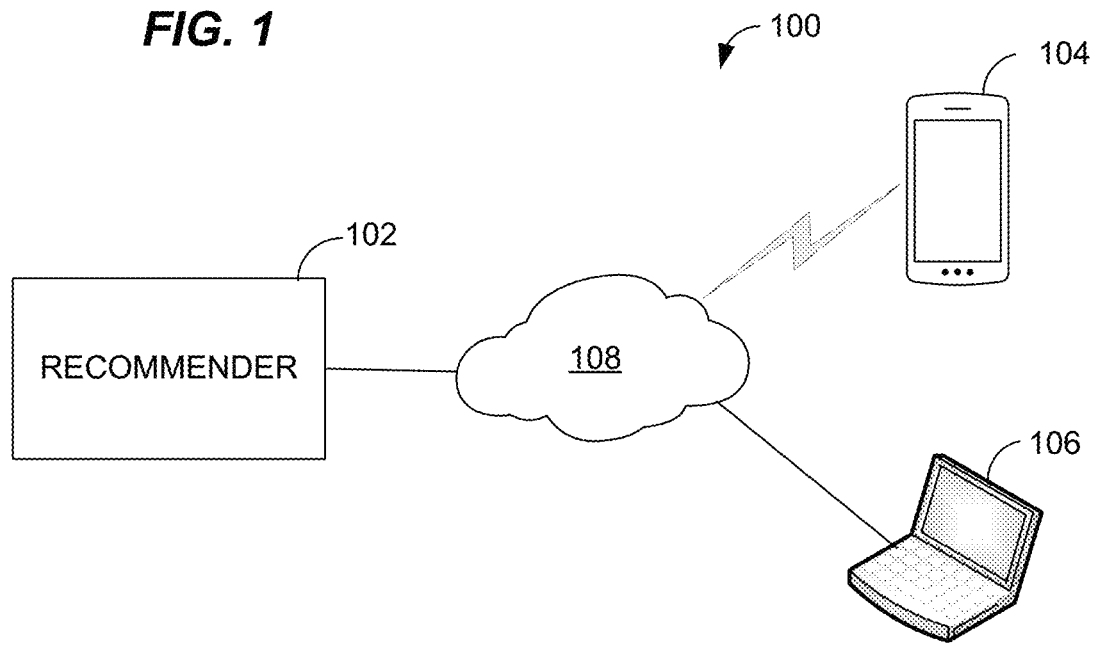
FIG. 1 is a schematic diagram illustrating a recommender system communicatively coupled to client devices providing generative noising for user privacy (SHY).
Figure 2:
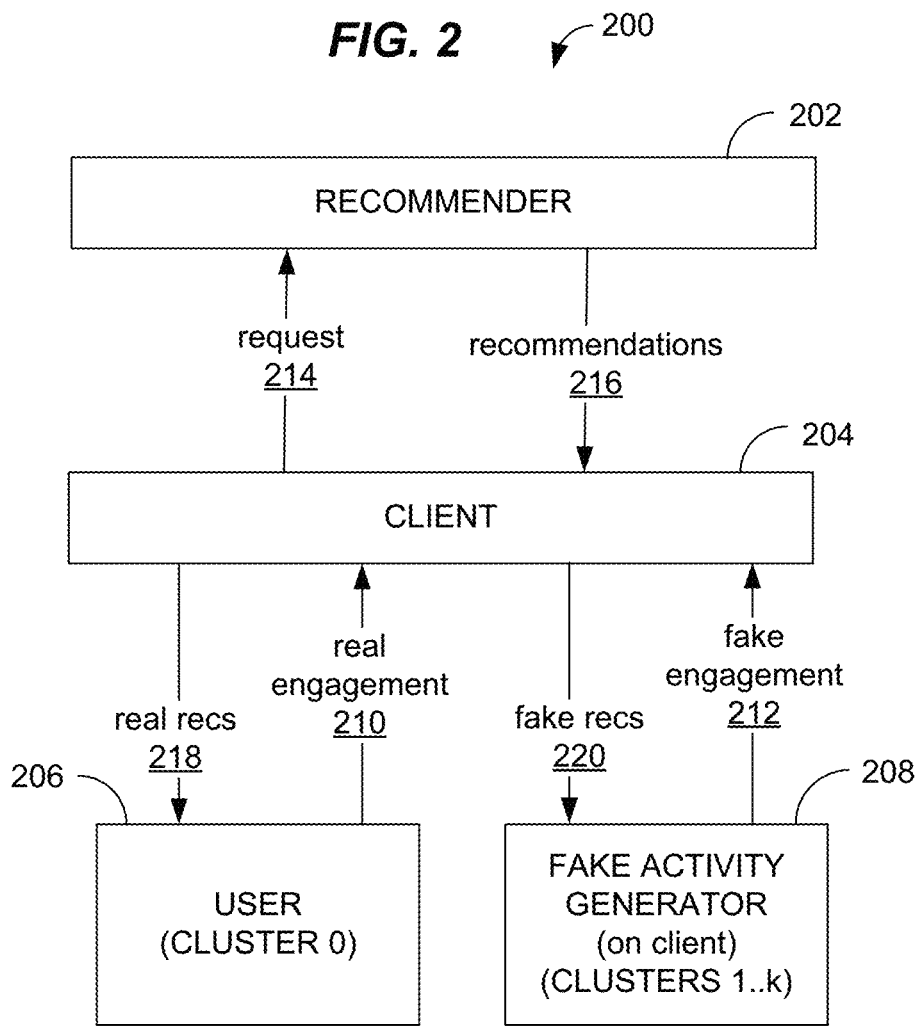
FIG. 2 is a concept diagram illustrating SHY data flow.

Referring to FIGS. 1 and 2, the present example concerns an item-based recommender 102, 202 that functions to provide users who each operating a client device (e.g., a smart phone 104 or personal computer 106) with recommended items based on items with which they have previously engaged. Each client device 104, 106 may communicate with the recommender 102, 202 via one or more communication and/or computer networks 108, for example, a wide area network, cellular telephony network, or satellite communications network. The recommender may be implemented in any suitable server, for example a stand-alone server, server array, cloud server or distributed server.

Prior to serving users, the recommender is trained with access to 'm' users and 'n' items until ready to serve recommendations. As used herein, a "request" from a client to the recommender is configured to enable the person using the recommender to obtain new recommendations. Features of a client device executing a SHY process for the user may include access to the user's true engagement history in a computer memory, a function for obfuscating a user's true engagement history when building an outgoing request to the recommender, and a function for surfacing relevant recommendations and showing them to the user.

FIG. 2 represents an overview of SHY data flow 200. The client device 204 combines real engagement data 210 and simulated ("fake") engagement data 212 to generate a request 214 that it sends to the recommender 202. The client 204 then divides the recommendations 216 returned by the recommender 202 into two sets: real recommendations 218 for showing to the user and those that will be candidate fake engagements 220.

The client sends the request 214 $r \in [0,1]^n$ to the recommender. The request 214 may be, or may include, a binary, typically sparse, vector in item-space. Each entry in the vector may represent a user's engagement with one item, and nonzero values may represent engagement beyond a certain threshold deemed appropriate for the setting. In embodiments of the systems 100, 200, for each new request from a client, the centralized recommendation server 102, 202 sees only a list of items and receives no identifying information from the client such as a user identifier (ID), device ID, Internet Protocol (IP) address, or other identifier from which the user may be identified.

Despite being anonymous, the user may be interested in obfuscating their engagement for additional security, for example, to avoid a breach of privacy if an adversary with access to the request discovers the user's identity. Two schemes for noising a request vector are compared below: uniform random, which has been shown to be differentially private in the learning phase of the recommender, and "organic" noise.

A request round is one step of a series of recursive information exchanges between the client and the recommender. In each recommendation round, the client assembles a list of items (the request) to send to the recommender, and the recommender returns a list of items, or recommendations based on the items it received from the client. For embodiments wherein the recommender is strictly item-based, each recommendation returned by the recommender, may include 3 parts: (1) the recommended item; (2) the associated item from the original request; and (3) a scaled weight $w \in [0,1]$, wherein w measures the "closeness" of the recommended item to the associated item, i.e., similarity.

In one request round, the recommender returns an equal number of items for each item in the original request. Note that items may be recommended multiple times in the list of recommendations returned by the recommender, as they may be close to one or more different associated items from the original request. This framework should be sufficiently general to extend to a range of item-based recommender implementations.

It may be assumed that the recommender is making recommendations based on some measure of similarity between two items, and that this similarity measure can be computed for any two items in the recommender's corpus. Any suitable similarity measure as known in the art (e.g., Euclidian distance, cosine distance, Jaccard distance, Pearson correlation distance) or that may be developed may be used by a recommender. The SHY method is agnostic with respect to the similarity measure used by the recommender. It may further be assumed that an adversary attempting to de-noise a user's request will have access to the pairwise similarity measure used by the recommender for making recommendation.

In an aspect, the recommender may reveal only the scaled weights of related items in a set of recommendations. This differentiates the current method from approaches where the entire model is available to a client to do recommendations locally, which could pose its own security and privacy risks. The SHY method is designed to strike a balance between the privacy that can be offered by on-device processing of recommendations and the design advantages of a centralized recommender.

Uniform random noise can be detected easily because the items added in by noise are on average farther away from other items in the request (i.e., less similar) than those items are from each other. If this is not true, the similarity score cannot be very effective for generating recommendations. To correct for this noise identifiability, the organically noising client 104, 204 builds up a user's public history over time in k clusters, where k is an integer greater than or equal to 1 which we call the noise factor. Each cluster is a group of similar items, e.g., a group meeting a defined threshold or measure of similarity.

Figure 3:
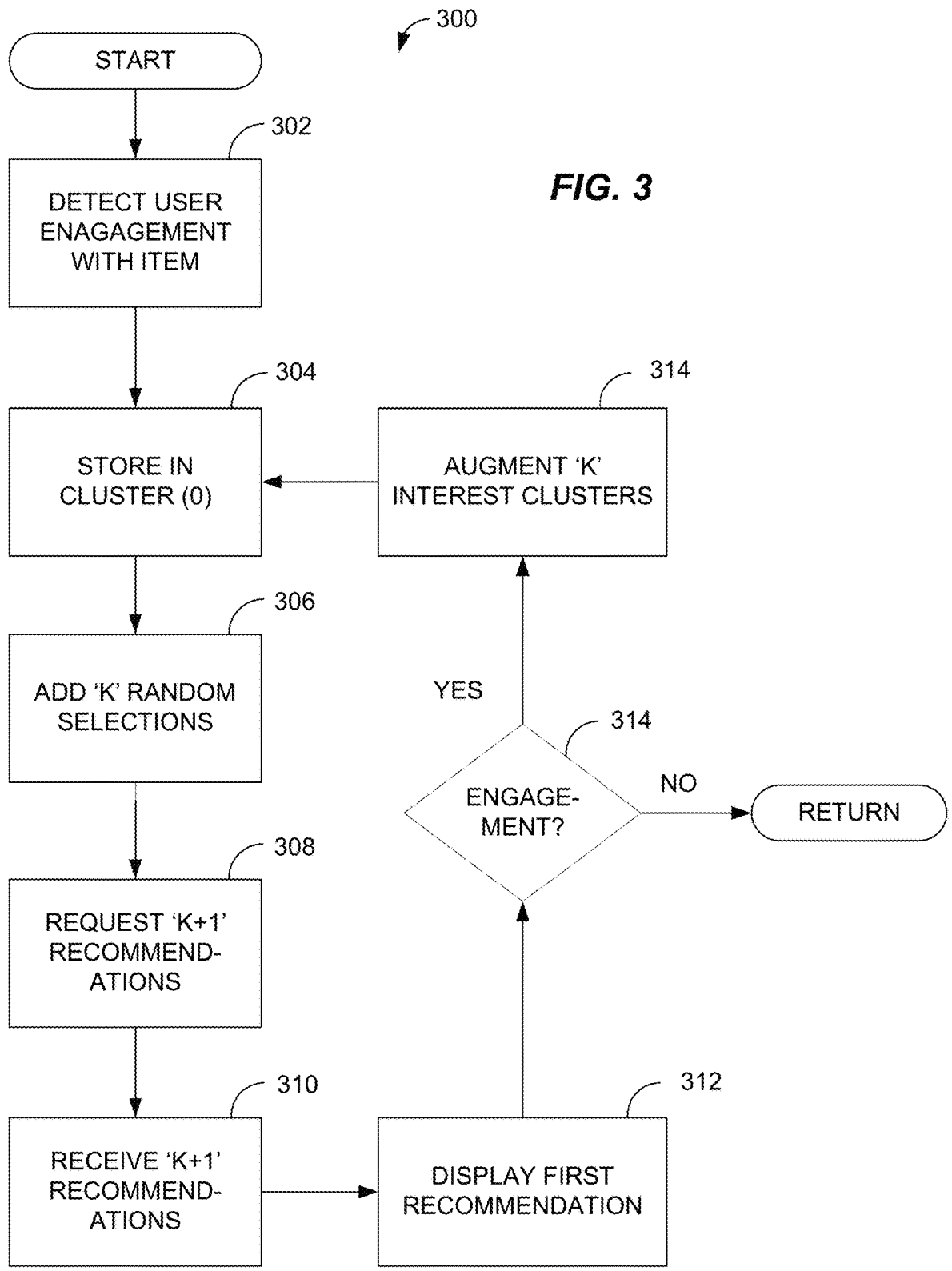
FIG. 3 illustrates an example of code for implementing a SHY algorithm.

Referring to FIG. 3, in a method 300 for organic noising, upon initialization and after detecting 302 user engagement with an item, at least one processor of the client device, at 304, stores the engaged item in cluster (0) 208 of the client device. At 306, the processor adds in k random items for the first item a user engages with. At 308, the processor requests recommendations for all k+1 selected items, including the user-selected item and the randomly selected item. At 310, the processor receives recommendations from the recommender for the k+1 items. At 312, the processor outputs the recommendation for the user-selected item on an output device, e.g. a display device such as a touchscreen or LCD screen. If the user selects another information item, at 314, the processor augments the k fake interest clusters 208 in equal measure, only adding in fake items that a user would have plausibly seen if that interest cluster were real, and adding in items from the same position in the re-ranking as the item the user genuinely engaged with in the zero cluster 206. If this symmetry between the real cluster (0) and the organic noise clusters is not broken, an adversary with access to the underlying model will not be able to distinguish between the 1/k+1 fraction of items that a user truly engaged with and the k/k+1 fraction of items that were added in as noise. At 304, the second select item is stored in cluster (0) and the recursive loop continues.

FIG. 4 illustrates an example of program code for organic noising. It should be apparent to programmers of ordinary skill that the code 400 provides a more detailed example of the recursive noising method more generally illustrated by FIG. 3. These and other, more detailed implementations may be adapted to make use of the methods for organic noising described herein, and to extend the method for use with various recommenders in different contexts.

The following experiment illustrates the difference between uniform random and organic noising. A dataset of user selections (Last.fm dataset) was used to build a binary user item matrix 'X' with 251544 rows (users) and 292590 columns (items). The algorithm for building the matrix was as follows: if a user had listened to an artist more than 50 times, the test recommender algorithm determined the user to "like" that artist and put a 1 in the corresponding place in the matrix. The processor normalized the matrix across rows, and then computed the singular value decomposition $X = U \Sigma V^T$ for the first 10 dimensions. Accordingly, in this example V is a 292,590×10 matrix where each row represents an item. The processor applied cosine similarity between these rows to form the basis of our experimental recommender.

For each item in a request to the recommender, the recommender returned the 100 nearest neighbors to this item by cosine similarity. The weight ascribed to each recommended item is an inverse normalized distance from the associated item from the original request. The recommender assigned the closest of these items a value of 1 and the farthest a value of 0. Next, the experiment tested obfuscation of user history by organic noising by a client, using the experimental recommender to provided recommendations.

Figure 5:
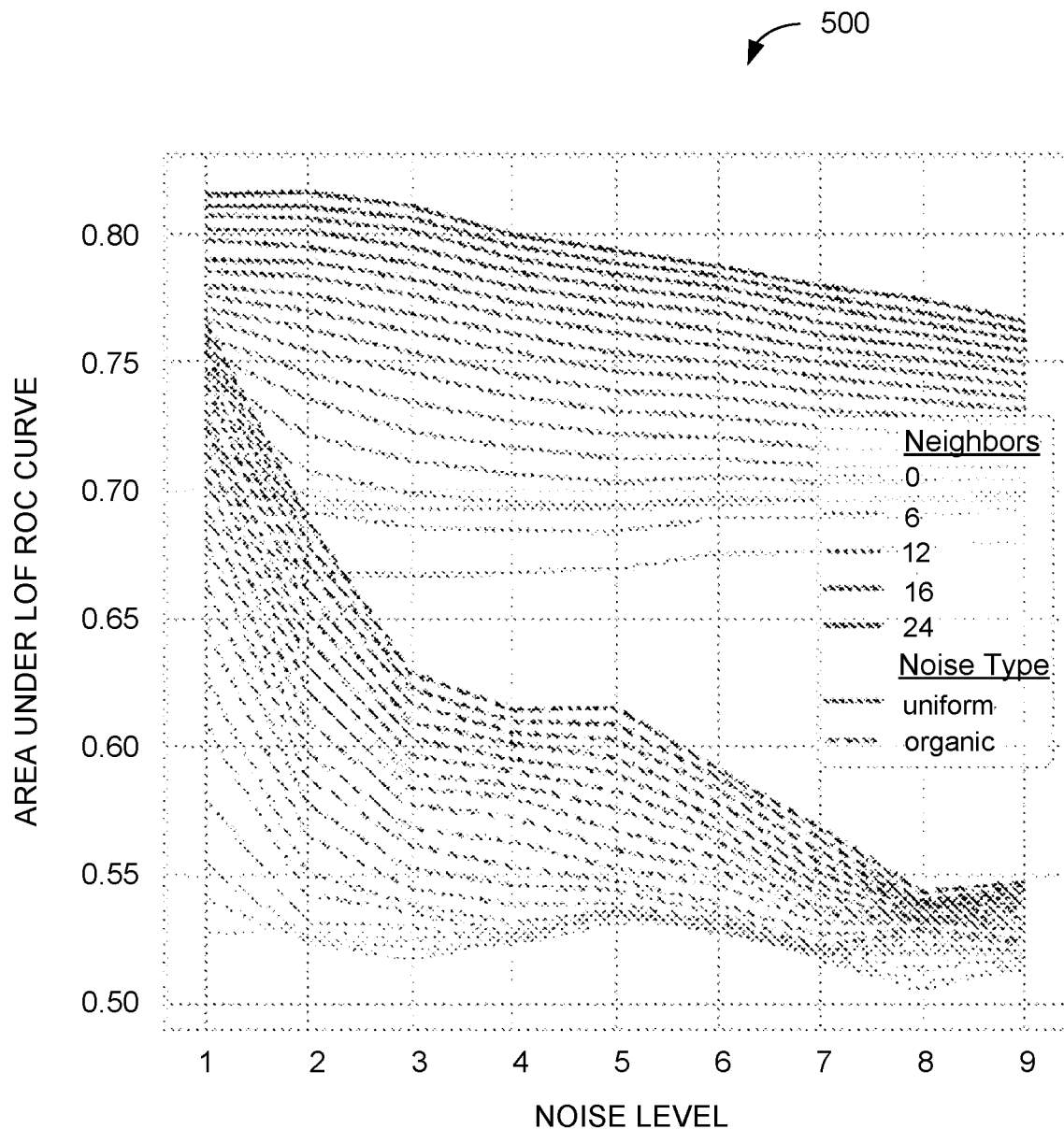
FIG. 5 is a chart illustrating a comparison of results from uniform and organic noising.

To attempt to detect added noise on a per-request basis, outlier detection was used on the item representations learned from the Singular Value Decomposition (SVD), consistent with the subspace methods of outlier detection. More particularly, the scikit-learn implementation of the Local Outlier Factor method of Breunig et al., henceforth referred to as LOF, was used for outlier detection. LOF reflects the intuition behind the SHY noising approach, that the items added in via organic noising should on average be closer to their nearest neighbors than items added in uniformly at random. We also picked LOF for its density sensitivity, as contrasted, e.g., with pure distance-based approach. The item embeddings resulting from the SVD may have regions that vary in density, and the LOF should be fairly robust to that natural variation. The analysis explored LOF using neighborhoods of up to 20 items, using cosine similarity as the distance measure. Results 500, as shown in FIG. 5, demonstrated that organic noise (lower curves) was consistently less detectable for all these values than was uniform random noise. The same was true across values of the noise level k ranging from 1 to 10.

FIG. 5 represents that as LOF neighborhood size increases (darker lines represent larger neighborhoods), noise detection improves (i.e. area under the ROC curve increases). But this increase is much less for high levels of organic noise (dashed lines) as compared to uniform noise (solid lines). Further, organic noise was less detectable than uniform noise at equal neighborhood sizes, and a minimum detectability is apparent at a noise level of 8 for the organic noise only.

It should be apparent that the organically noising client performs exactly as well as the uniformly noising client in making recommendations: both make item-based requests that contain the user's true engagement history, re-rank recommendations to show the user with exactly the same logic, and as a result show the user exactly the same items in the same order.

Thus, the SHY noising scheme affords users true plausible deniability over their content engagement history at recommendation time, which is more commensurate with consumer notions of privacy than existing notions that focus only on the accessibility of user data via a trained machine learning model. Several directions for further inquiry remain. First, the notion of plausible deniability over user history could be formalized and organic noise could be proven to protect it. Second, as including the entirety of a user's history in a query may often not be needed, limiting query size could also help to further obfuscate user interests in the SHY implementation. Third, exploration of how well recommenders can learn from organically noised user history may be desirable, for example, to know if such a learning procedure can be shown to be differentially private. The combination of plausible deniability at request time and differential privacy guarantees is a promising future direction for further development. Although the present implementation of organic noising does not immediately translate to other recommendation systems, such as those employing matrix factorization to impute full user vectors, it may be possible to adapt organic noise to other popular recommendation schemes.

Figure 6:
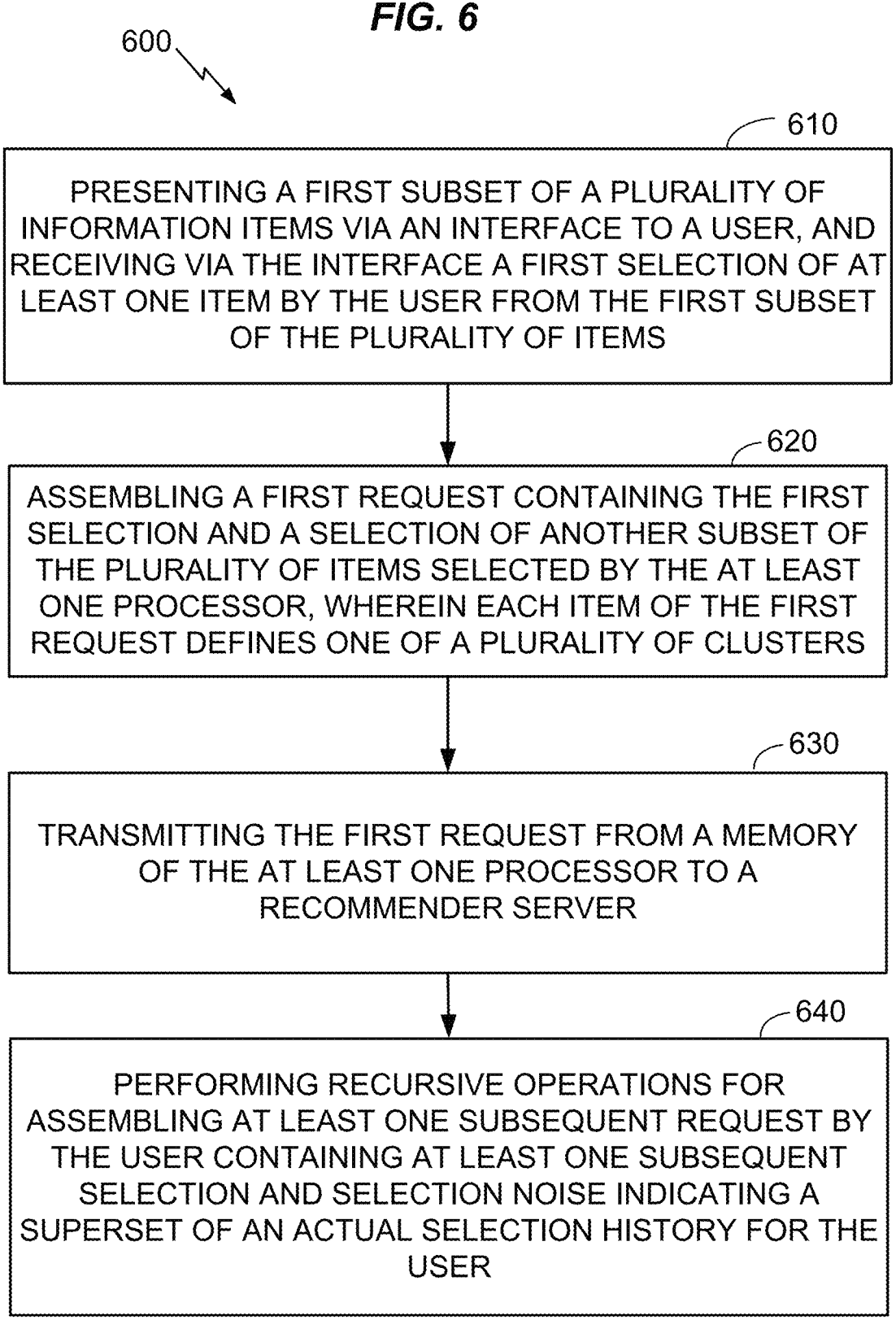
FIG. 6 is a flow chart illustrating a method for generative noising for user privacy.

In accordance with the foregoing, and by way of additional example, FIG. 6 shows more general aspects of a method or methods 600 according to one embodiment, as may be performed by a processor of a client device as described herein. It should be appreciated that the more general operations of method 600 may include or embody more detailed aspects of corresponding methods described herein above to perform functions described more generally in connection with the following figures, or omitted for brevity.

Referring to FIG. 6, a computer-implemented method 600 for obfuscating a request for transmitting to a recommender server may include receiving a list of recommendations from a recommender server in response to a request. It should be appreciated that in the normal case such request may be part of an indefinitely long sequence of search or other recommendation requests that a user may frequently request of the same server. The method 600 should be capable of obfuscating user requests that are part of an indefinitely long series. To enable description more conveniently an arbitrary one of such requests is described as a first request, that is, the request that initiates the method 600. The method 600 may include, at 610 presenting, by at least one processor of the client device, a first subset of a plurality of information items via an interface to a user, and receiving via the interface a first selection of at least one item by the user from the first subset of the plurality of items. This is the user selection of the first item from the recommendation list.

The method 600 may further include at 620 assembling, by the at least one processor, a first request containing the first selection and a selection of another subset of the plurality of items selected by the at least one processor, wherein each item of the first request defines one of a plurality of clusters. The phrase "defines" in this context refers to each processor-selected item being the first in a unique subset or "cluster" of similar items that will, through recursive operations as described, be used to obfuscate the user selection by generation of organic noise that is indistinguishable from the signal, i.e., the actual user selection. Only the client device can discriminate between actual user selection and the generated noise, which it filters to present recommendations picked by the recommender to be of actual interest to the user. The method 600 may further include, at 630, transmitting the first request from a memory of the at least one processor to the recommender server.

At 640, the method may further include performing, by the at least one processor, recursive operations for assembling at least one subsequent request by the user containing at least one subsequent selection and selection noise indicating a superset of an actual selection history for the user. More detailed aspects of these recursive operations have already been described above in connection with FIGS. 2-5. Certain more detailed aspects are also described in connection with the following figures.

Figure 7:
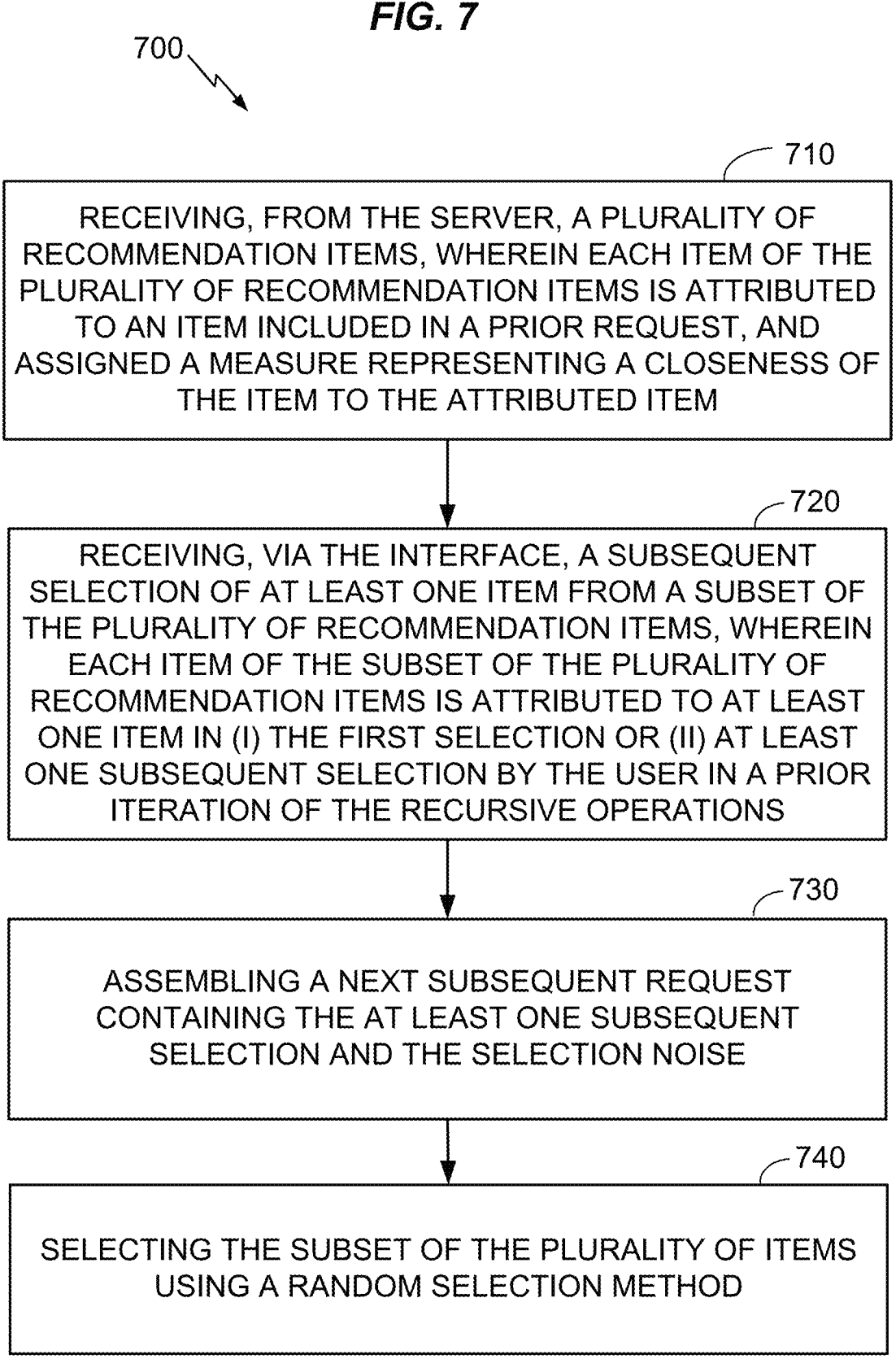
FIGS. 7 and 8 are flow charts illustrating additional operations that may be included in the method of FIG. 6.

Accordingly, the method 600 may include any one or more additional operations as described above and below herein. Each of these additional operations is not necessarily performed in every embodiment of the method, and the presence of any one of the operations does not necessarily require that any other of these additional operations also be performed. For example, with reference to FIG. 7, the method 600 may further include one or more of additional operations 700. The method 600 may include, at 710, the recursive operations by the at least one processor further including receiving, from the server, a plurality of recommendation items, wherein each item of the plurality of recommendation items is attributed to an item included in a prior request (the "attributed item"), and assigned a measure representing a closeness of the item to the attributed item. For example, the plurality of recommendation items may be presented as a ranked search result.

At 720 the recursive operations of the method 600 may further include receiving, via the interface, a subsequent selection of at least one item from a subset of the plurality of recommendation items, wherein each item of the subset of the plurality of recommendation items is attributed to at least one item in (i) the first selection or (ii) at least one subsequent selection by the user in a prior iteration of the recursive operations. At 730, the recursive operations may further include assembling a next subsequent request containing the at least one subsequent selection and the selection noise. In an aspect, at 740, the processor may select the subset of the plurality of items using a random or quasi-random selection method.

Figure 8:
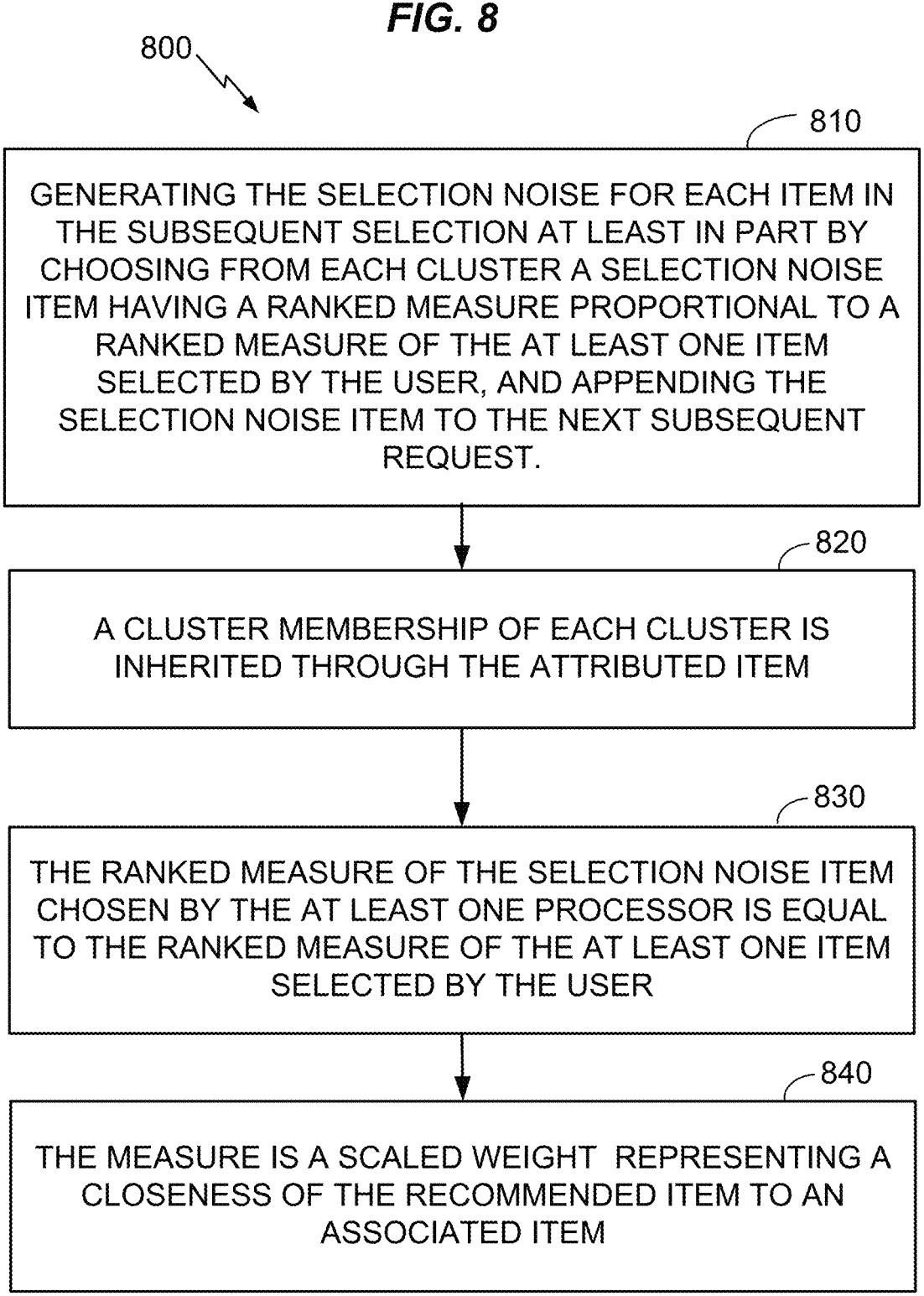

Referring to FIG. 8, the method 600 may include one or more of the additional operations 800. For example, at 810 the method 600 may include the at least one processor generating the selection noise (e.g., "organic" noise) for each item in the subsequent selection at least in part by choosing from each cluster a selection noise item having a ranked measure proportional to a ranked measure of the at least one item selected by the user, and appending the selection noise item to the next subsequent request. "Proportional" here means a linear or equivalent function of.

For example, as indicated at 820, the processor may select each item such that a cluster membership of each cluster is inherited through the attributed item, i.e., to a corresponding one of the plurality of recommendation items attributed to at least one item in (i) the first selection or (ii) at least one subsequent selection by the user in a prior iteration of the recursive operations. Thus, each item in each cluster is close, by evaluation of the recommendation server, to a corresponding user selection.

For further example, as indicated at 830, the ranked measure of the selection noise item chosen by the at least one processor is equal to the ranked measure of the at least one item selected by the user. That is, the operative function may be unity, i.e., equality. For example, it the user selects the third ranked item in a list of recommendations for the actual item, the processor may select the third ranked item in each recommendation list for the obfuscation clusters. In an alternative, the processor may select an item at a fixed or variable offset of the user-selected list position.

In another aspect, the method 600 may include, at 840, the measure representing a closeness of the item to the attributed item being a scaled value or weight.

Figure 9:
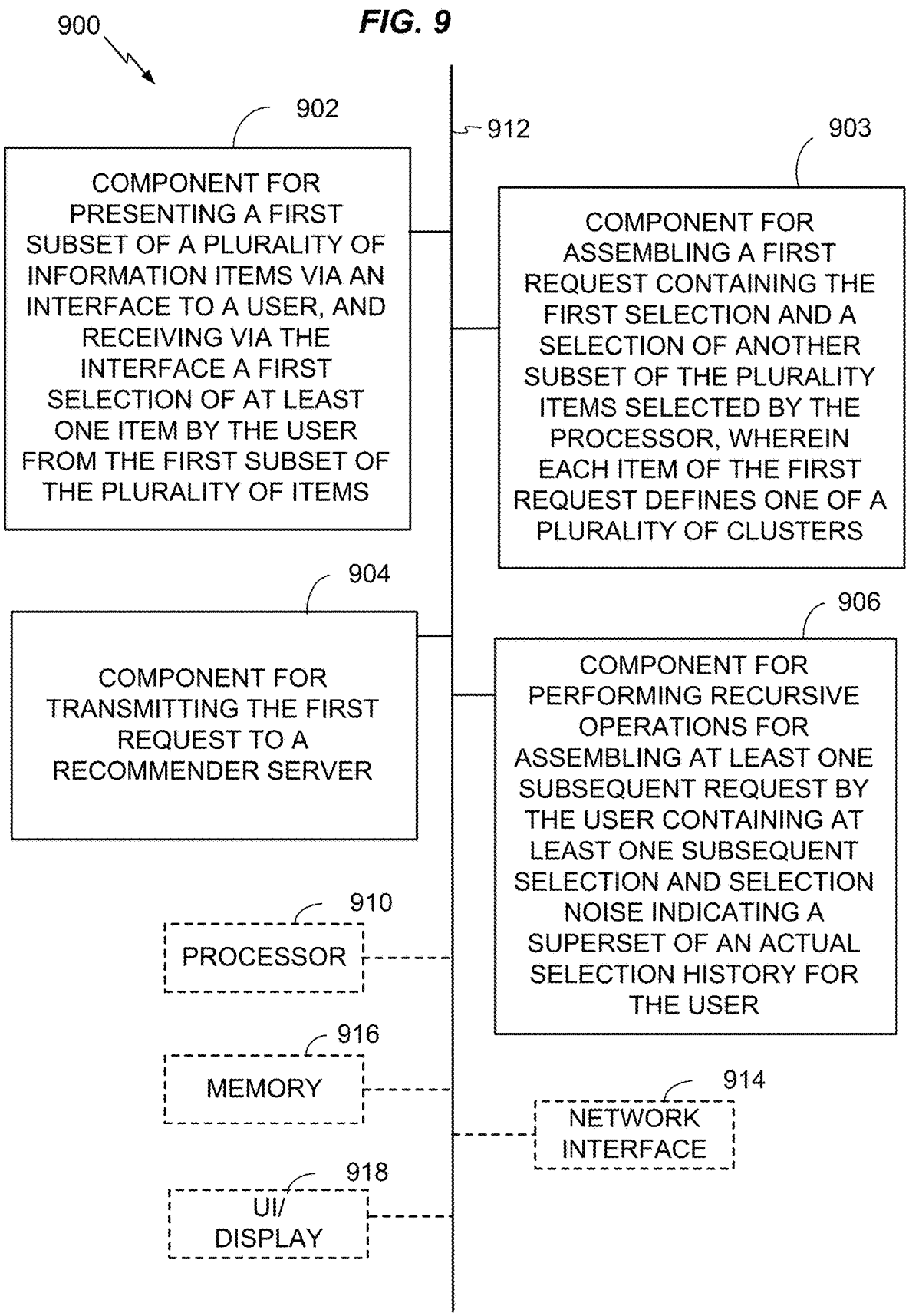
FIG. 9 is a conceptual block diagram illustrating components of an apparatus or system for generating noise to protect privacy of user selections.

FIG. 9 is a conceptual block diagram illustrating components of an apparatus or system 900 for generating noise to protect privacy of user selections as described herein, according to one embodiment. As depicted, the apparatus or system 900 may include functional blocks that can represent functions implemented by a processor, software, or combination thereof (e.g., firmware).

As illustrated in FIG. 9, the apparatus or system 900 may comprise an electrical component 902 for presenting a first subset of a plurality of information items via an interface to a user, and receiving via the interface, a first selection of at least one item by the user from the first subset of the plurality of items. The component 902 may be, or may include, a means for said presenting and receiving. Said means may include the processor 910 coupled to the memory 916, and to the input device 914, the processor executing an algorithm based on program instructions stored in the memory. Such algorithm may include a sequence of more detailed operations, for example, receiving a list of recommended items from a recommender server, presenting the list on the display 918, receiving user input correlated to an item on the list, and determining that the user input is a selection of the item.

The apparatus or system 900 may further comprise an electrical component 903 for assembling a first request containing the first selection and a selection of another subset of the plurality of items selected by the at least one processor, wherein each item of the first request defines one of a plurality of clusters. The component 903 may be, or may include, a means for said assembling. Said means may include the processor 910 coupled to the memory 916, and to the input device 914, the processor executing an algorithm based on program instructions stored in the memory. Such algorithm may include a sequence of more detailed operations, for example, storing the user-engaged item in a dedicated cluster of the client device 900, adding a non-zero number k of processor-selected items (e.g., by random selection) random from the list, one for each of a set k of obfuscating clusters, storing the processor-selected items in a data structure each associated with a corresponding separate cluster, and compiling a request for recommendations for the user-selected item and the k processor-selected items.

The apparatus or system 900 may further comprise an electrical component 904 for transmitting the first request to a recommender server. The component 904 may be, or may include, a means for said transmitting. Said means may include the processor 910 coupled to the memory 916, and to the network interface 914, the processor executing an algorithm based on program instructions stored in the memory. Such algorithm may include a sequence of more detailed operations, for example, retrieving a network address for the server, providing the request form a memory of an application layer to a transmission layer, packetizing the request per a network protocol, and sending packets according to the protocol via the network interface.

The apparatus or system 900 may further comprise an electrical component 906 for performing recursive operations for assembling at least one subsequent request by the user containing at least one subsequent user selection and selection noise indicating a superset of an actual selection history for the user. The component 906 may be, or may include, a means for said recursive operations. Said means may include the processor 910 coupled to the memory 916, and to the input device 914, the processor executing an algorithm based on program instructions stored in the memory. Such algorithm may include a sequence of more detailed operations, for example, the method 300 described in connection with FIG. 3, and variations thereon, and further operations 700, 800 described in connection with FIGS. 7 and 8.

The apparatus 900 may optionally include a processor module 910 having at least one processor, in the case of the apparatus 900 configured as a data processor. The processor 910, in such case, may be in operative communication with the modules 902-906 via a bus 912 or other communication coupling, for example, a network. The processor 910 may initiate and schedule of the processes or functions performed by electrical components 902-906.

In related aspects, the apparatus 900 may include a network interface module 914 operable for communicating with a storage device over a computer network. In further related aspects, the apparatus 900 may optionally include a module for storing information, such as, for example, a memory device/module 916. The apparatus 900 may include a user interface and display device 918, for example, a touchscreen device or LCD screen with a keyboard, pointer, and/or microphone input. The computer readable medium or the memory module 916 may be operatively coupled to the other components of the apparatus 900 via the bus 912 or the like. The memory module 916 may be adapted to store computer readable instructions and data for effecting the processes and behavior of the modules 902-906, and sub-components thereof, or the processor 910, or the method 300 or 600 and one or more of the additional operations 700, 800 described in connection with the method 600. The memory module 916 may retain instructions for executing functions associated with the modules 902-906. While shown as being external to the memory 916, it is to be understood that the modules 902-906 can exist within the memory 916.

The various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the application and design constraints imposed on the overall system. Skilled artisans may implement the described functionality in varying ways for each application, but such implementation decisions should not be interpreted as causing a departure from the scope of the present disclosure.

As used in this application, the terms "component", "module", "system", and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer or system of cooperating computers. By way of illustration, both an application running on a server and the server can be a component. One or more components may reside within a process and/or thread of execution and a component may be localized on one computer and/or distributed between two or more computers.

Program instructions may be written in any suitable high-level language, for example, C, C++, C#, JavaScript, or Java™, and compiled to produce machine-language code for execution by the processor. Program instructions may be grouped into functional modules, to facilitate coding efficiency and comprehensibility. It should be appreciated that such modules, even if discernable as divisions or grouping in source code, are not necessarily distinguishable as separate code blocks in machine-level coding. Code bundles directed toward a specific function may be considered to comprise a module, regardless of whether machine code on the bundle can be executed independently of other machine code. In other words, the modules may be high-level modules only.

Various aspects will be presented in terms of systems that may include several components, modules, and the like. It is to be understood and appreciated that the various systems may include additional components, modules, etc. and/or may not include all the components, modules, etc. discussed in connection with the figures. A combination of these approaches may also be used. The various aspects disclosed herein can be performed on electrical devices including devices that utilize touch screen display technologies and/or mouse-and-keyboard type interfaces. Examples of such devices include computers (desktop and mobile), smart phones, personal digital assistants (PDAs), and other electronic devices both wired and wireless.

In addition, the various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. As used herein, a "processor" encompasses any one or functional combination of the foregoing examples.

Operational aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

Furthermore, the one or more versions may be implemented as a method, apparatus, or article of manufacture using standard programming and/or engineering techniques to produce software, firmware, hardware, or any combination thereof to control a computer to implement the disclosed aspects. Non-transitory computer readable media can include but are not limited to magnetic storage devices (e.g., hard disk, floppy disk, magnetic strips . . . ), optical disks (e.g., compact disk (CD), digital versatile disk (DVD), BluRay™ . . . ), smart cards, solid-state devices (SSDs), and flash memory devices (e.g., card, stick). Of course, those skilled in the art will recognize many modifications may be made to this configuration without departing from the scope of the disclosed aspects.

In view of the exemplary systems described supra, methodologies that may be implemented in accordance with the disclosed subject matter have been described with reference to several flow diagrams. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described herein. Additionally, it should be further appreciated that the methodologies disclosed herein are capable of being stored on an article of manufacture to facilitate transporting and transferring such methodologies to computers.

The previous description of the disclosed aspects is provided to enable any person skilled in the art to make or use the present disclosure. Various modifications to these aspects will be clear to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

The invention claimed is:

1. A method for obfuscating a request for transmitting to a recommender server, the method comprising:
   presenting, by at least one processor, a first subset of a plurality of information items via an interface to a user, and receiving via the interface a first selection of at least one item by the user from the first subset of the plurality of items;
   assembling, by the at least one processor, a first request containing the first selection and a selection of another subset of the plurality of items selected by the at least one processor, wherein each item of the first request defines one of a plurality of clusters;
   transmitting the first request from a memory of the at least one processor to a recommender server; and
   performing, by the at least one processor, recursive operations for assembling at least one subsequent request by the user containing at least one subsequent selection and selection noise indicating a superset of an actual selection history for the user; wherein the at least one processor generates the selection noise for each item in the subsequent selection at least in part by choosing from each cluster a selection noise item having a ranked measure proportional to a ranked measure of the at least one item selected by the user, and appending the selection noise item to the next subsequent request.

2. The method of claim 1, wherein the at least one processor performs the recursive operations further comprising receiving, from the server, a plurality of recommendation items, wherein each item of the plurality of recommendation items is attributed to an item included in a prior request, and assigned a measure representing a closeness of the item to the attributed item.

3. The method of claim 2, wherein the recursive operations further comprise receiving, via the interface, a subsequent selection of at least one item from a subset of the plurality of recommendation items, wherein each item of the subset of the plurality of recommendation items is attributed to at least one item in (i) the first selection or (ii) at least one subsequent selection by the user in a prior iteration of the recursive operations.

4. The method of claim 3, wherein the recursive operations further comprise assembling a next subsequent request containing the at least one subsequent selection and the selection noise.

5. The method of claim 2, wherein a cluster membership of each cluster is inherited through the attributed item.

6. The method of claim 1, wherein the ranked measure of the selection noise item chosen by the at least one processor is equal to the ranked measure of the at least one item selected by the user.

7. The method of claim 2, wherein the measure is a scaled weight representing a closeness of the recommended item to an associated item.

8. The method of claim 1, wherein the at least one processor selects the subset of the plurality of items using a random selection method.

9. An apparatus for generating noise to protect privacy of user selections, comprising at least one processor coupled to a memory, the memory holding program instructions that when executed by the at least one processor, cause the apparatus to perform:
   presenting a first subset of a plurality of information items via an interface to a user, and receiving via the interface, a first selection of at least one item by the user from the first subset of the plurality of items;
   assembling a first request containing the first selection and a selection of another subset of the plurality of items selected by the at least one processor, wherein each item of the first request defines one of a plurality of clusters;
   transmitting the first request to a recommender server;
   performing recursive operations for assembling at least one subsequent request by the user containing at least one subsequent selection and selection noise indicating a superset of an actual selection history for the user, and
   generating the selection noise for each item in the subsequent selection at least in part by choosing from each cluster a selection noise item having a ranked measure proportional to a ranked measure of the at least one item selected by the user, and appending the selection noise item to the next subsequent request.

10. The apparatus of claim 9, wherein the memory holds further instructions for the recursive operations further comprising receiving, from the server, a plurality of recommendation items, wherein each item of the plurality of recommendation items is attributed to an item included in a prior request, and assigned a measure representing a closeness of the item to the attributed item.

11. The apparatus of claim 10, wherein the memory holds further instructions for performing the recursive operations at least in part by receiving, via the interface, a subsequent selection of at least one item from a subset of the plurality of recommendation items, wherein each item of the subset of the plurality of recommendation items is attributed to at least one item in (i) the first selection or (ii) at least one subsequent selection by the user in a prior iteration of the recursive operations.

12. The apparatus of claim 11, wherein the memory holds further instructions for performing the recursive operations at least in part by assembling a next subsequent request containing the at least one subsequent selection and the selection noise.

13. The apparatus of claim 10, wherein the memory holds further instructions for determining a cluster membership of each cluster by inheritance through the attributed item.

14. The apparatus of claim 13, wherein the memory holds further instructions for choosing the selection noise item by ranked measure equal to the ranked measure of the at least one item selected by the user.

15. The apparatus of claim 10, wherein the memory holds further instructions evaluating the measure as a scaled weight representing a closeness of the recommended item to an associated item.

16. The apparatus of claim 10, wherein the memory holds further instructions for selecting the subset of the plurality of items using a random selection method.

17. An apparatus for generating noise to protect privacy of user selections, comprising:
   means for presenting a first subset of a plurality of information items via an interface to a user and for receiving via the interface, a first selection of at least one item by the user from the first subset of the plurality of items;

means for assembling a first request containing the first selection and a selection of another subset of the plurality of items selected by the at least one processor, wherein each item of the first request defines one of a plurality of clusters;

means for transmitting the first request to a recommender server; and means for performing recursive operations for assembling at least one subsequent request by the user containing at least one subsequent selection and selection noise indicating a superset of an actual selection history for the user; and means for generating the selection noise for each item in the subsequent selection at least in part by choosing from each cluster a selection noise item having a ranked measure proportional to a ranked measure of the at least one item selected by the user, and appending the selection noise item to the next subsequent request.

\* \* \* \* \*

UNITED STATES PATENT AND TRADEMARK OFFICE
CERTIFICATE OF CORRECTION

PATENT NO. : 11,907,401 B2
APPLICATION NO. : 16/919056
DATED : February 20, 2024
INVENTOR(S) : Sarah J. Rich and Benjamin Recht It is certified that error appears in the above-identified patent and that said Letters Patent is hereby corrected as shown below:

On the Title Page

In title, and in the Specification, Column 1, Line 2, delete "WHTLE" and insert --WHILE--

Item (56) "Other Publications", Column 2, Line 1, delete "M.-" and insert --M.--

Signed and Sealed this
Ninth Day of April, 2024

Katherine Kelly Vidal
*Director of the United States Patent and Trademark Office*